United States Patent
Johansson et al.

(10) Patent No.: US 9,225,704 B1
(45) Date of Patent: Dec. 29, 2015

(54) UNIFIED MANAGEMENT OF THIRD-PARTY ACCOUNTS

(71) Applicant: Amazon Technologies, Inc., Reno, NV (US)

(72) Inventors: Jesper Mikael Johansson, Redmond, WA (US); Darren Ernest Canavor, Redmond, WA (US); Jon Arron McClintock, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 116 days.

(21) Appl. No.: 13/917,138

(22) Filed: Jun. 13, 2013

(51) Int. Cl.
*H04L 29/06* (2006.01)

(52) U.S. Cl.
CPC ...................................... *H04L 63/08* (2013.01)

(58) Field of Classification Search
CPC ........................................................ H04L 63/08
See application file for complete search history.

(56) References Cited

U.S. PATENT DOCUMENTS

| | | | |
|---|---|---|---|
| 7,685,298 | B2 | 3/2010 | Day et al. |
| 8,510,811 | B2 | 8/2013 | Kuang et al. |
| 8,713,129 | B2 | 4/2014 | Schneider |
| 8,762,512 | B1 * | 6/2014 | Sundaram et al. ............ 709/223 |
| 8,789,135 | B1 | 7/2014 | Pani |
| 8,812,666 | B2 | 8/2014 | Kikinis |
| 8,819,851 | B1 * | 8/2014 | Johansson ....................... 726/28 |
| 8,843,997 | B1 | 9/2014 | Hare |
| 2005/0188212 | A1 * | 8/2005 | Laferriere et al. ............ 713/185 |
| 2008/0201454 | A1 | 8/2008 | Soffer |
| 2009/0070412 | A1 * | 3/2009 | D'Angelo et al. ............ 709/203 |
| 2011/0231651 | A1 | 9/2011 | Bollay |
| 2011/0265147 | A1 * | 10/2011 | Liu .................................... 726/4 |
| 2012/0084844 | A1 * | 4/2012 | Brown et al. ..................... 726/6 |
| 2012/0192256 | A1 * | 7/2012 | Peterson et al. .................. 726/7 |
| 2013/0086657 | A1 * | 4/2013 | Srinivasan et al. ............... 726/6 |
| 2013/0111543 | A1 * | 5/2013 | Brown et al. ..................... 726/1 |
| 2013/0347078 | A1 * | 12/2013 | Agarwal et al. .................. 726/4 |
| 2014/0089661 | A1 | 3/2014 | Mahadik et al. |
| 2014/0310792 | A1 | 10/2014 | Hyland et al. |

OTHER PUBLICATIONS

U.S. Patent Application entitled "Proxy Server-Based Network Site Account Management," filed Mar. 11, 2013, U.S. Appl. No. 13/792,678.

U.S. Patent Application entitled "Mapping Stored Client Data to Requested Data Using Metadata," filed Nov. 16, 2012, U.S. Appl. No. 13/679,254.

U.S. Patent Application entitled "Logout From Multiple Network Sites," filed Feb. 1, 2012, U.S. Appl. No. 13/363,685.

(Continued)

*Primary Examiner* — Brandon Hoffman
*Assistant Examiner* — William Corum, Jr.
(74) *Attorney, Agent, or Firm* — Thomas | Horstemeyer, LLP

(57) ABSTRACT

Disclosed are various embodiments for management of third-party accounts for users in an organization. It is determined whether a user in an organization is to be provided with managed access to a third-party network site. An account may be managed for the user with the third-party network site in response when the user is to be provided with managed access to the third-party network site. A security credential is stored for the managed account. A client computing device associated with the user is configured to authenticate with the third-party network site using the security credential. The user may be restricted from accessing the security credential.

20 Claims, 9 Drawing Sheets

(56) References Cited

OTHER PUBLICATIONS

U.S. Patent Application entitled "Recovery of Managed Security Credentials," filed Feb. 1, 2012, U.S. Appl. No. 13/363,681.
U.S. Patent Application entitled "Presenting Managed Security Credentials to Network Sites," filed Feb. 1, 2012, U.S. Appl. No. 13/363,675.
U.S. Patent Application entitled "Authentication Management Services," filed Feb. 1, 2012, U.S. Appl. No. 13/363,664.
U.S. Patent Application entitled "Account Management for Multiple Network Sites," filed Feb. 1, 2012, U.S. Appl. No. 13/363,654.
U.S. Patent Application entitled "Managing Security Credentials," filed Jul. 29, 2011, U.S. Appl. No. 13/194,287.
U.S. Patent Application entitled "Authentication Manager," filed Aug. 12, 2009, U.S. Appl. No. 12/539,886.
U.S. Patent Application entitled "Behavior Based Identity System," filed Jul. 23, 2012, U.S. Appl. No. 13/555,724.
U.S. Patent Application entitled "Enforcing Restrictions on Third-Party Accounts," filed Jun. 13, 2013, U.S. Appl. No. 13/917,143.

\* cited by examiner

UNIFIED MANAGEMENT OF THIRD-PARTY ACCOUNTS

BACKGROUND

Enterprise users sometimes need access to third-party services in order to perform their jobs. Such services may include, for example, marketing management services, sales management services, social networking services, file sharing services, research services, and so on. Users who need access to such services may personally create accounts for work use. A given user may utilize several third-party accounts for work use.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to unified management of third-party accounts for users in an organization. Users in an organization may need access to one or more third-party services in order to perform their functions relating to the organization. In some cases, the users may manually create accounts with such services. In other cases, information technology (IT) staff for the organization may manually create the accounts for the users, or the IT staff may provide users with security credentials for preexisting accounts. Manual management of such accounts quickly becomes cumbersome for large organizations. When a user is no longer associated with the organization, it may be difficult for the IT staff to gain access to the account or to deny the departing user access to the account. Moreover, it may be a headache for the users to keep up with the various third-party accounts that they use during the course of performing their functions.

Various embodiments of the present disclosure facilitate automated management of third-party accounts within an organization. Account creation, security credential creation and rotation, authentication, and/or other functions may be centrally managed. Additionally, account management functions may be linked to organizational changes. For example, a new account may automatically be created for a new user, and an existing account may be automatically deactivated for a departing user. Such management of the accounts may be transparent with respect to the third-party provider of the accounts, as such accounts may appear to the third-party provider to be ordinary user accounts. In other words, various embodiments facilitate federation of organizational credentials without third-party sites knowing the organizational credentials or otherwise being specially configured to participate in the federation.

In some embodiments, restrictions may be enforced on managed third-party accounts through the use of a proxy server. The proxy server may inspect the network traffic pertaining to the third-party account to ensure that the usage of the third-party account meets organizational guidelines. Remote usage of the third-party account (e.g., home or mobile use) may be routed through the proxy server by a client even when the client is not connected to the internal network of the organization. In one embodiment, the inspection functionality of the proxy server may be implemented within the client. In the following discussion, a general description of the system and its components is provided, followed by a discussion of the operation of the same.

Figure 1A:
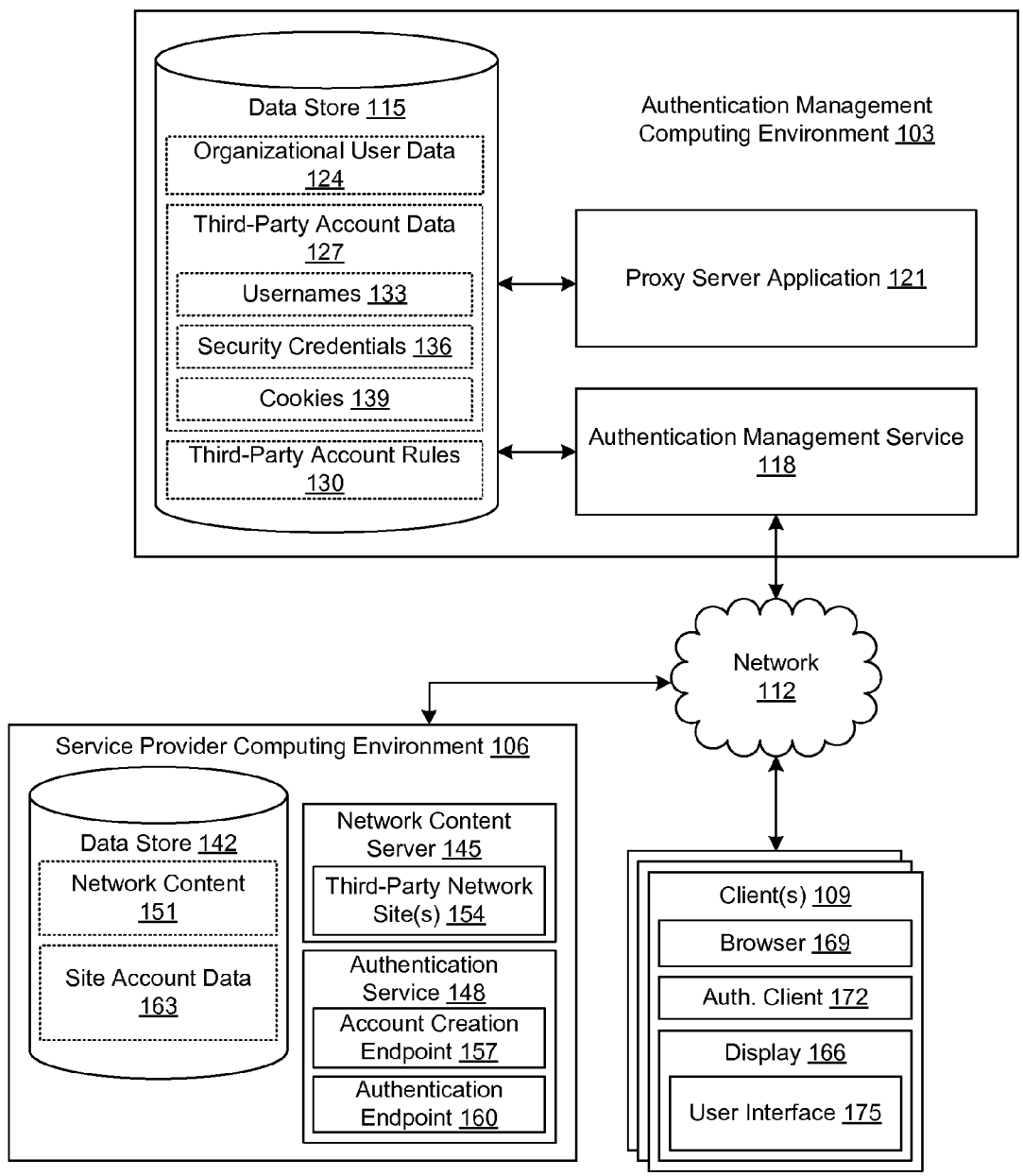
FIGS. 1A and 1B are drawings of networked environments according to various embodiments of the present disclosure.

With reference to FIG. 1A, shown is a networked environment 100a according to various embodiments. The networked environment 100a includes a authentication management computing environment 103, one or more computing environments 106, and one or more clients 109 in data communication via a network 112. The network 112 includes, for example, the Internet, intranets, extranets, wide area networks (WANs), local area networks (LANs), wired networks, wireless networks, or other suitable networks, etc., or any combination of two or more such networks.

The authentication management computing environment 103 may comprise, for example, a server computer or any other system providing computing capability. Alternatively, the authentication management computing environment 103 may employ a plurality of computing devices that are arranged, for example, in one or more server banks or computer banks or other arrangements. Such computing devices may be located in a single installation or may be distributed among many different geographical locations. For example, the authentication management computing environment 103 may include a plurality of computing devices that together may comprise a cloud computing resource, a grid computing resource, and/or any other distributed computing arrangement. In some cases, the authentication management computing environment 103 may correspond to an elastic computing resource where the allotted capacity of processing, network, storage, or other computing-related resources may vary over time.

Various applications and/or other functionality may be executed in the authentication management computing environment 103 according to various embodiments. Also, various data is stored in a data store 115 that is accessible to the authentication management computing environment 103. The data store 115 may be representative of a plurality of data stores 115 as can be appreciated. The data stored in the data store 115, for example, is associated with the operation of the various applications and/or functional entities described below.

The components executed on the authentication management computing environment 103, for example, may include an authentication management service 118, a proxy server application 121, and other applications, services, processes, systems, engines, or functionality not discussed in detail herein. The authentication management service 118 is executed to provide unified management of third-party network site accounts for users in an organization. To this end, the authentication management service 118 may create accounts for users with third-party network sites, rotate security credentials for such accounts, disable and/or reassign accounts, facilitate authentication of clients 109 with the third-party network sites, and/or perform other functions.

In some embodiments, the proxy server application 121 is configured to receive network site resource requests from clients 109 via the network 112, make proxied network site requests on behalf of the clients 109, and then return resulting resources from the network sites to the clients 109. The proxy server application 121 may be configured to inspect the network traffic between the clients 109 and the third-party network sites for compliance with various rules. For example, a rule may specify that if an account is designated for personal use, work-related data is not permitted to be sent to the third-party network site. Conversely, a rule may specify that if an account is designated for work use, personal data is not permitted to be sent to the third-party network site. The clients 109 may be configured in some embodiments to enforce usage of the proxy server application 121 in order for the user to gain access to the managed third-party account.

The data stored in the data store 115 includes, for example, organizational user data 124, third-party account data 127, third-party account rules 130, and potentially other data. The organizational user data 124 includes various data regarding users in an organization. The organization may correspond to an enterprise, governmental entity, non-profit entity, cooperative, and/or any other organization. Such users may be employees, contractors, members, directors, owners, and/or other type of users who have roles within the organization. The organizational user data 124 may include data such as definitions of third-party accounts for which a particular user role or a particular user is to be granted access. Such accounts may be free or paid accounts. In this regard, the organizational user data 124 may define third-party accounts for which the organization is willing to pay for access to particular users. The organizational user data 124 may define a status for each user, which may indicate, for example, that the user is active, inactive, terminated, in good standing, not in good standing, and/or subject to another classification.

The third-party account data 127 includes various data regarding third-party accounts managed by the authentication management service 118. For example, the third-party account data 127 may include usernames 133, security credentials 136, cookies 139, and/or other data that may be employed for clients 109 to authenticate with a network site corresponding to the third-party account. The security credentials 136 may include passwords, numerical codes, answers to knowledge-based questions, encryption keys, OAuth tokens, and/or other data that may be employed for authentication of a third-party account. The cookies 139 may be served up by the third-party sites for session tracking.

The third-party account rules 130 include various rules that configure the operation of the authentication management service 118 with respect to third-party accounts. In this regard, the third-party account rules 130 may configure how the authentication management service 118 interacts with a particular third-party network site. Various third-party account rules 130 may configure how authentication is performed, how accounts are created, how accounts are disabled, how security credentials 136 are rotated and/or generated, how usernames 133 are generated, and/or other configuration parameters. In some embodiments, the third-party account rules 130 may include rules regarding the types of network traffic that are permissible for the specific third-party account and user. Further, the third-party account rules 130 may configure whether the user is permitted to utilize the third-party account when the network traffic between the client 109 of the user and the third-party network site is not capable of inspection by the proxy server application 121.

Each service provider computing environment 106 may comprise, for example, a server computer or any other system providing computing capability. Alternatively, the service provider computing environment 106 may employ a plurality of computing devices that are arranged, for example, in one or more server banks or computer banks or other arrangements. Such computing devices may be located in a single installation or may be distributed among many different geographical locations. For example, the service provider computing environment 106 may include a plurality of computing devices that together may comprise a cloud computing resource, a grid computing resource, and/or any other distributed computing arrangement. In some cases, the service provider computing environment 106 may correspond to an elastic computing resource where the allotted capacity of processing, network, storage, or other computing-related resources may vary over time.

Various applications and/or other functionality may be executed in the service provider computing environment 106 according to various embodiments. Also, various data is stored in a data store 142 that is accessible to the service provider computing environment 106. The data store 142 may be representative of a plurality of data stores 142 as can be appreciated. The data stored in the data store 142, for example, is associated with the operation of the various applications and/or functional entities described below.

The components executed on the service provider computing environment 106, for example, include a network content server 145, an authentication service 148, and other applications, services, processes, systems, engines, or functionality not discussed in detail herein. The network content server 145 is executed to serve up network content 151 for one or more third-party network sites 154. To this end, the network content server 145 may utilize protocols such as hypertext transfer protocol (HTTP), simple object access protocol (SOAP), representational state transfer (REST), and/or other protocols. In one embodiment, the network content server 145 comprises a commercially available HTTP server such as, for example, Apache® HTTP Server, Apache® Tomcat®, Microsoft® Internet Information Services (IIS), and/or other servers.

The authentication service 148 may facilitate account creation and/or authentication via an account creation endpoint 157 and/or an authentication endpoint 160. The account creation endpoint 157 and/or authentication endpoint 160 may utilize an application programming interface (API) for account creation and/or authentication. As a non-limiting example, the authentication service 148 may include web service APIs to perform such account creation and/or authentication.

The data stored in the data store 142 includes, for example, network content 151, site account data 163, and potentially other data. The network content 151 may include text, code, templates, hypertext markup language (HTML), extensible markup language (XML), cascading style sheets (CSS), images, audio, video, animations, and/or other data served up via a third-party network site 154. The site account data 163 may include usernames, security credentials, session identifiers, profile data, preferences, and/or other data associated with user accounts configured for the third-party network sites 154.

The client 109 is representative of a plurality of client devices that may be coupled to the network 112. The client 109 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 109 may include a display 166. The display 166 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 109 may be configured to execute various applications such as a browser 169, an authentication client 172, and/or other applications. The browser 169 may be executed in a client 109, for example, to access network content 151 served up by the service provider computing environment 106 and/or other servers, thereby rendering a user interface 175 on the display 166. The user interface 175 may correspond to a network page, a mobile application screen, etc. The authentication client 172 is executed to facilitate authentication and/or account creation for third-party accounts via the browser 169. In one embodiment, the authentication client 172 corresponds to a plug-in for the browser 169. The user interface 175 may include portions generated by the authentication client 172. The client 109 may be configured to execute applications beyond the browser 169 and the authentication client 172 such as, for example, mobile applications, email applications, social networking applications, and/or other applications.

Next, a general description of the operation of the various components of the networked environment 100*a* is provided. To begin, the authentication client 172 is deployed on the clients 109 belonging to or otherwise used within an organization. Users are created for the organization, thereby producing organizational user data 124. Administrators may configure various third-party account rules 130 pertaining to the use of third-party accounts by users in the organization. For example, the third-party account rules 130 may indicate that a certain user or user role should have access to a particular third-party network site 154 in order to perform activities related to the organization. The third-party account rules 130 may indicate whether the organization is to pay for access to a particular third-party network site 154 by a particular user or group of users.

Users at the client 109 authenticate with the authentication management service 118. To this end, a user may supply a username and password for a user identity associated with the organization and defined within the organizational user data 124. Through this authentication, the user may be granted access to various resources within the organization, e.g., access to intranet sites, file servers, email accounts, operating system accounts, and/or other secured resources managed by the organization. In one embodiment, the authentication of the user may be performed by way of Kerberos.

After authentication, the user may use the browser 169 to access various third-party network sites 154 served within the service provider computing environment 106. The service provider computing environment 106 is operated by a third party who does not correspond to the organization. For example, the third party may employ a separate identity system that is different from the identity system of the organization. Some of the third-party network sites 154 may include secured resources for which a third-party account is used to provide access. Such third-party accounts may be pre-created by the authentication management service 118 before creation of the user or in response to creation of the user for the organization. Alternatively, such third-party accounts may be created in response to a user request, in response to determining that the organization is willing to pay (or is paying) for access, and/or in response to other factors.

The user may be prompted to confirm whether access to the third-party network site 154 is for personal use or organization-related use. It may be the case that personal use is disallowed. In another case, personal use may be allowed, with such third-party accounts not being managed by the authentication management service 118. In still another case, personal use may be allowed, with accounts being managed by the authentication management service 118.

If an existing account is not available, a new third-party account may be automatically generated, or an existing user-managed third-party account may be brought into the system for management by the authentication management service 118. Third-party accounts may be created by way of an account creation endpoint 157 or by form filling on a form presented in network content 151. In creating a new account, the authentication management service 118 and/or the authentication client 172 may be configured to automatically generate the username 133 and/or the security credential 136. In this regard, the security credential 136 may be automatically generated according to a security credential specification for the third-party network site 154 to ensure that a security credential meeting length, character set, and/or other requirements are met. As part of such account creation, payment instruments of the organization (e.g., credit cards, lines of credit, checking accounts, etc.) may be automatically configured for use on a third-party account that is for organization-related purposes.

If an existing user-managed account is to become centrally managed, the user may be prompted to provide a username 133, a security credential 136, and/or other data to facilitate transitioning the account to central management. The authentication client 172 may be employed to render user interfaces 175 to obtain selection of organization-related or personal use, to obtain information for existing accounts, and/or other information. Where a user-managed account is imported, the authentication management service 118 may be configured to rotate the security credentials 136 for the account upon the importing to assert ownership over the account.

After a third-party account has been created or imported, the client 109 may authenticate with the third-party network site 154, for example, in response to the user accessing a uniform resource locator (URL) associated with a secured resource. The authentication client 172, as configured by the third-party account rules 130, obtains third-party account data 127 from the authentication management service 118. The authentication client 172 then may facilitate authentication by filling out a log-in form or by initiating a request directed to the authentication endpoint 160.

The authentication client 172 and/or the browser 169 may be configured to make the usernames 133 and/or the security credentials 136 inaccessible by a user at the client 109. For example, the client 109 may be configured to have no user interface for viewing or retrieving the usernames 133 and/or security credentials 136. In some cases, the usernames 133 and/or security credentials 136 may be scrambled while stored in client 109. Where usernames 133 and/or security credentials 136 are filled in within a form in the client 109, the authentication client 172 and/or the browser 169 may be configured to prevent the user from gaining access to the form or interfering with the form-filling process. As a result of the inaccessibility, the user may never know the username 133 and/or the security credential 136 for a particular third-party network site 154. Because the username 133 and/or the security credential 136 are not disclosed to the users, the username 133 and/or the security credential 136 are protected from usage or theft by former employees.

The authentication management service 118 and/or the authentication client 172 may configure the third-party network site 154 such that any security credential reset requests are directed to a managed channel of communication and not to a user-accessible channel of communication. For example, a third-party network site 154 may be configured to send password reset emails only to an email account managed by the authentication management service 118. In this way, the user does not have the ability to obtain reset tokens or new passwords from the password reset emails. In addition to emails, managed channels of communication may include text messages, phone calls, and/or other channels of communication.

The authentication management service 118 and/or the authentication client 172 may be configured to rotate, or change, the security credentials 136 periodically or in response to the occurrence of some event. As a non-limiting example, the security credentials 136 may be rotated once a month on a designated day. As another non-limiting example, the security credentials 136 may be rotated upon being imported into the system. As still another non-limiting example, the security credentials 136 may be rotated upon departure of the user from the organization and reassignment of the corresponding third-party account(s) to another user.

In some cases, a particular third-party account may be associated with multiple users. As a non-limiting example, an account may be created with a file sharing network site, and an organization may wish to grant access to the account for two or more users. The users have the same role in the organization and/or may collaborate via the use of the same account. In some cases, multiple users may be associated with the same third-party account to avoid duplication of fees paid to the third-party network site 154. The authentication management service 118 may manage use of the account to avoid or otherwise manage concurrent use.

Authentication management functionality may be located to varying degrees in the authentication management service 118 (server-side) or in the authentication client 172 (client-side) in various embodiments. For example, in one embodiment, the authentication management service 118 may perform account creation, security credential rotation, and/or other functions. In another embodiment, the authentication client 172 may perform the account creation, the security credential rotation, and/or the other functions. Because a user may utilize multiple clients 109 within an organization, the third-party account data 127 may be maintained in a centralized data store 115 in the authentication management computing environment 103 and then pushed as needed to a client 109 at which the user is logged in. Alternatively, the third-party account data 127 for a user may remain resident in a client 109 that is associated with the user.

The authentication management service 118 may be configured to push the third-party account rules 130 to the authentication client 172. Alternatively, the authentication client 172 may request various third-party account rules 130 on an as-needed basis, e.g., the authentication client 172 may request third-party account rules 130 specific to a particular third-party network site 154 when the particular third-party network site 154 is visited.

In some embodiments, a proxy server application 121 may be utilized to perform functions otherwise performed by the authentication client 172. In such embodiments, the client 109 may include a proxy client application or other application in order to maintain state for the proxy server application 121. For example, in embodiments employing a proxy server application 121, when an authenticated user at a client 109 accesses a third-party network site 154 via the proxy server application 121, the proxy server application 121 may transparently handle account creation and/or authentication functions. In other words, when the proxy server application 121 transparently handles these functions, the process of account creation and/or authentication is handled within the proxy server application 121 on behalf of the client 109, and the account creation and/or authentication interfaces of third-party network site 154 may be hidden from the client 109.

In some embodiments, the proxy server application 121 and/or the authentication management service 118 may perform authentication with the third-party network site 154 within the authentication management computing environment 103 on behalf of an authenticated user at a client 109. In one embodiment, this authentication may result in a cookie 139 being set, for example, to maintain session state for the third-party network site 154. After the cookie 139 is set, the authentication management service 118 may be configured to push the cookie 139 to the client 109. Accordingly, the browser 169 may utilize the cookie 139 to communicate with the third-party network site 154 in an authenticated state.

The status of any particular user with the organization may change over time, resulting in updates to the organizational user data 124. For example, a user may leave the organization or may be transferred to another role in the organization. Over time, it may be decided to provide the user access with additional or fewer third-party accounts. The authentication management service 118 may be configured to implement such account changes based upon changes to the organizational user data 124 or in response to directives from other systems, e.g., human resources systems in the authentication management computing environment 103.

To illustrate, a particular employee in an enterprise may be terminated or may no longer have a business need to access various third-party accounts. The employee may currently have access to various third-party accounts. In response to the event, the authentication management service 118 may disable access by the employee to the various third-party accounts. In doing so, the authentication management service 118 may communicate with the third-party network sites 154 and/or authentication services 148 associated with the third-party network sites 154 to rotate the security credentials 136 for the third-party accounts, to revoke the security credentials 136 for the third-party accounts, and/or to close the third-party accounts. The authentication management service 118 may internally reassign one or more of the third-party accounts to one or more other users in the organization. It is noted that security of the third-party account may be maintained because the third-party account is managed by the authentication management service 118. The end user may not even know the security credentials 136 for the third-party account.

Further, control for resetting and/or rotating the security credentials 136 is vested with the authentication management service 118 and/or the authentication client 172 rather than the end user. To this end, the authentication management service 118 and/or the authentication client 172 may ensure that the user at the client 109 does not have access to security credential change or reset functions through the third-party network site 154. For example, the authentication client 172 may be configured, via the corresponding third-party account rules 130 to block a network page or function of a third-party network site 154 that enables password changes or resets. In some cases, the authentication management service 118 and/or the authentication client 172 may configure a channel of communication with the third-party network site 154 for credential resets, where the end user does not have access to the channel of communication.

Where security credentials 136 are exposed to the user, the authentication management service 118 may be configured to periodically monitor with the third-party network site 154 to verify that the stored security credentials 136 are still valid and have not been changed by the user. If the authentication management service 118 detects that the security credentials 136 have been changed with the third-party network site 154, the authentication management service 118 may raise an alarm with an administrator, disable access by the user to organizational resources, or take another action.

In some embodiments, the authentication management service 118 may obtain location data or other auditing data from the third-party network site 154 indicating, for example, where the client 109 was located when a logon occurred. The authentication management service 118 may compare this auditing data with rules for acceptable use, e.g., to ensure that if a security credential 136 were checked out, that it was used only in an acceptable location. Upon any discrepancies, the authentication management service 118 may raise an alarm with an administrator, disable access by the user to organizational resources, or take another action.

In certain circumstances, a user may desire access to a managed third-party account via a client 109 that is not managed by the organization. For example, the user may wish to access a managed third-party account via a mobile device or from a personal laptop. For such situations, the authentication management service 118 may facilitate checkout of security credentials 136. Temporary security credentials 136 may be issued for the user, and such credentials may have a specific lifetime after which they are deactivated. Such deactivation may correspond to a rotation of the security credentials 136 as performed by the authentication management service 118.

Various techniques relating to authentication management are described by U.S. Patent Application entitled "AUTHENTICATION MANAGER" filed on Aug. 12, 2009, having application Ser. No. 12/539,886; U.S. Patent Application entitled "MANAGING SECURITY CREDENTIALS" filed on Jul. 29, 2011, having application Ser. No. 13/194,287; U.S. Patent Application entitled "ACCOUNT MANAGEMENT FOR MULTIPLE NETWORK SITES" filed on Feb. 1, 2012, having application Ser. No. 13/363,654; U.S. Patent Application entitled "AUTHENTICATION MANAGEMENT SERVICES" filed on Feb. 1, 2012, having application Ser. No. 13/363,664; U.S. Patent Application entitled "PRESENTING MANAGED SECURITY CREDENTIALS TO NETWORK SITES" filed on Feb. 1, 2012, having application Ser. No. 13/363,675; U.S. Patent Application entitled "RECOVERY OF MANAGED SECURITY CREDENTIALS" filed on Feb. 1, 2012, having application Ser. No. 13/363,681; U.S. Patent Application entitled "LOGOUT FROM MULTIPLE NETWORK SITES" filed on Feb. 1, 2012, having application Ser. No. 13/363,685; U.S. Patent Application entitled "MAPPING STORED CLIENT DATA TO REQUESTED DATA USING METADATA" filed on Nov. 16, 2012, having application Ser. No. 13/679,254; U.S. Patent Application entitled "PROXY SERVER-BASED NETWORK SITE ACCOUNT MANAGEMENT" filed on Mar. 11, 2013, having application Ser. No. 13/792,678; all of which are incorporated herein by reference in their entirety.

Figure 1B:
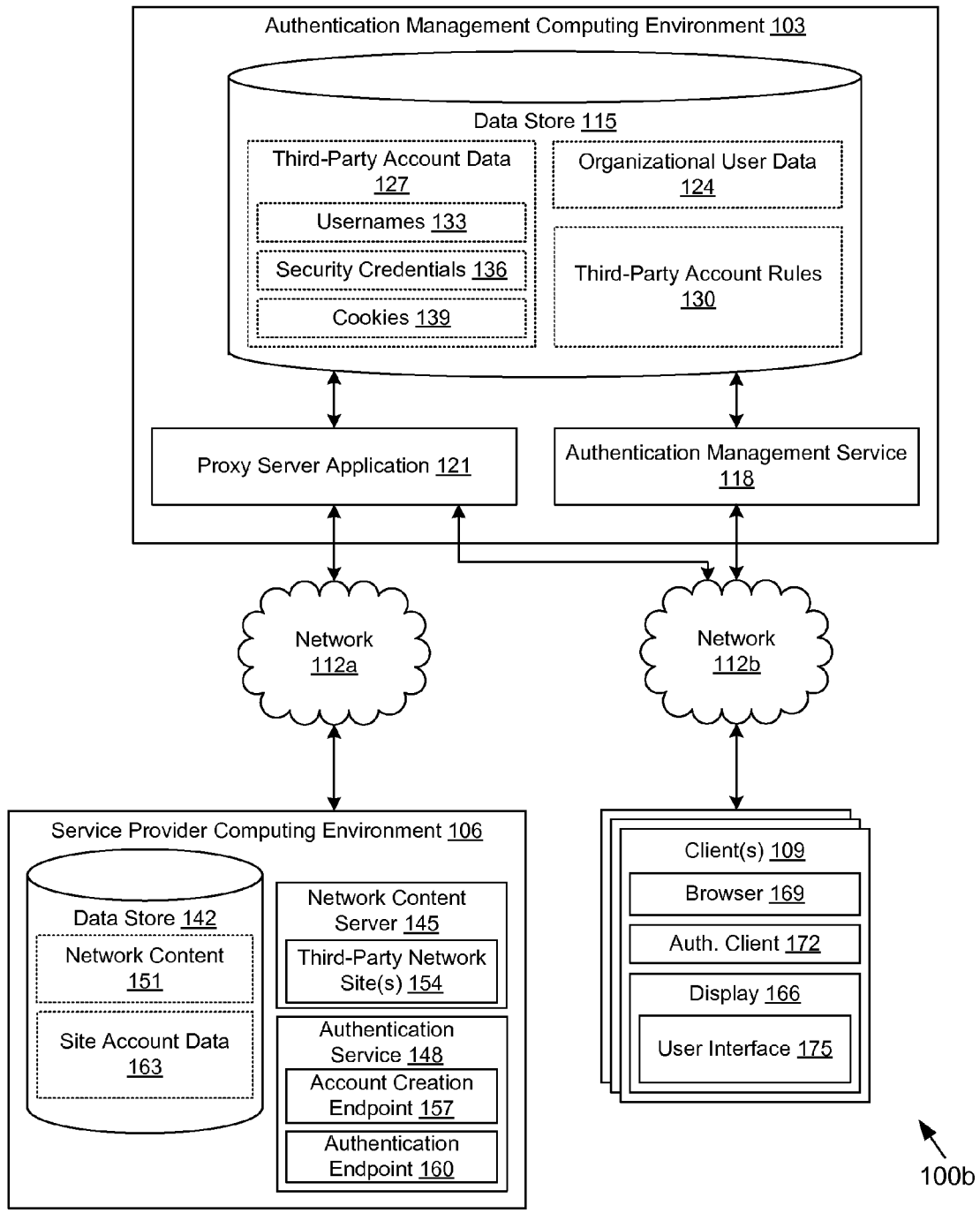

Turning now to FIG. 1B, shown is another example of a networked environment 100b according to various embodiments. In comparison to the networked environment 100a (FIG. 1A), the networked environment 100b clearly shows that the network traffic between the clients 109 and the service provider computing environment 106 is routed through the proxy server application 121. The networks 112a and 112b may correspond to the same network 112 or different networks 112. In one embodiment, the network 112a corresponds to a network 112 that is external to the organization, while the network 112b corresponds to a network 112 that is internal to the organization.

Because the network traffic between the client 109 and the service provider computing environment 106 is routed by way of the proxy server application 121, the organization is capable of inspecting the network traffic. Accordingly, the organization is capable of enforcing various rules and/or restrictions on the use of particular third-party accounts. In some cases, the network traffic may be inspected by network equipment capable of reconstructing application-layer data not involving a proxy server application 121. The rules that are applied may be uniform across the organization or may be specific to particular users and/or third-party network sites 154.

The rules for permissible use of a third-party account may depend on whether the account is classified as for personal use or organizational use. Such a classification may be user provided, for example, during an account creation or registration workflow. When a third-party account is classified as personal use, the organization may wish to enforce rules that organization-related data is not to be exchanged between the client 109 and the service provider computing environment 106. As non-limiting examples, the proxy server application 121 may inspect the network traffic for keywords (e.g., "company confidential") or certain types of documents (e.g., computer-assisted drafting (CAD) drawings may be prohibited from being transferred to personal file sharing accounts). As another non-limiting example, the proxy server application 121 may inspect the network traffic for geotags that correspond to geographical locations within a workplace. In this regard, a picture taken within a company workplace may be geotagged with the workplace location, and a rule may indicate that such a picture may not be shared via a third-party social networking account. In some scenarios, a rule may configure the proxy server application 121 to seek predefined canary data in the network traffic, where the presence of the canary data indicates improper usage of the third-party account. The canary data may correspond to data that would not otherwise be transferred, provided, or accessed under acceptable use and that is made available for tracing purposes.

Conversely, when an account is classified as for organization purposes, the network traffic may be inspected to ensure that personal-related data is not exchanged. As a non-limiting example, a rule may specify that purchases in certain predefined item categories are personal use. As another non-limiting example, a rule may specify that a residence address of the user appearing in the network traffic may correspond to prohibited personal use.

The proxy server application 121 may be configured to take various actions in response to determining that rules have not been complied with. For example, the specific third-party account may be disabled, transferred to another user, flagged for manual review, and so on. Alternatively, the organizational account of the user within the systems of the organization may be disabled, transferred to another user, flagged for manual review, and so on. The actions that are performed may depend on the specific rules, users, and/or third-party accounts.

In one embodiment, the rule may pertain to behavior-based identity verification of the user. For example, the rule(s) may indicate that certain behavior is inconsistent with the behavior expected of the user. Behavior expected of the user may be predefined or may be dynamically determined from past behavior of the authenticated user with respect to the specific third-party account or other usage monitored by the organization. Various techniques relating to behavior-based identity verification are described in U.S. Patent Application entitled "BEHAVIOR BASED IDENTITY SYSTEM" filed on Jul. 23, 2012, having application Ser. No. 13/555,724, which is incorporated herein by reference in its entirety.

It is noted that the enforcement of the various rules by way of network traffic inspection depends on the availability of the network traffic for inspection. In networks 112b under control of the organization, this may not be a problem. However, if clients 109 are deployed for home use or mobile use, the users may choose to log in to third-party accounts without having the network traffic routed through the proxy server application 121.

In such an embodiment, the authentication client 172 may be configured to restrict access to one or more third-party accounts if the proxy server application 121 is not used. To this end, the authentication client 172 may examine browser 169 settings, perform a network probe, or otherwise ascertain whether the proxy server application 121 is being used or is being bypassed. Where the proxy server application 121 is being bypassed, the authentication client 172 may deny access to one or more third-party managed accounts. The authentication client 172 may receive directives from the proxy server application 121 indicating whether the network traffic is being inspected. The authentication client 172 may then implement an action in response to the directive, e.g., deny or restrict access. In some cases, the authentication client 172 itself may function as a proxy and perform at least some of the functions of the proxy server application 121.

Figure 2A:
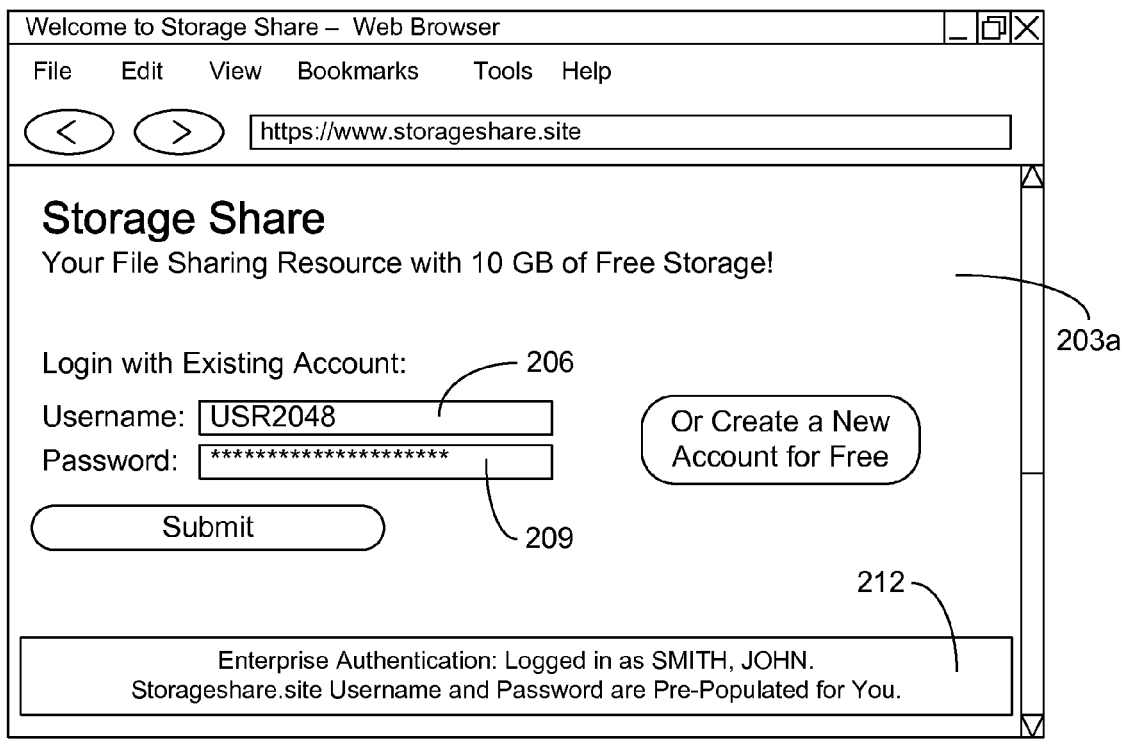
FIGS. 2A and 2B are drawings of example user interfaces rendered by a client in the networked environment of FIG. 1A according to various embodiments of the present disclosure.

Referring next to FIG. 2A, shown is one example of a user interface 175a rendered by a client 109 (FIG. 1A) in the networked environment 100a (FIG. 1A) according to various embodiments. The user interface 175a is rendered by a browser 169 (FIG. 1A) and an authentication client 172 (FIG. 1A) executed in the client 109. The user interface 175a presents a network page 203a for a third-party network site 154 (FIG. 1A), which in this non-limiting example, is "www.storageshare.site." The network page 203a includes functionality to log in with an existing account with the third-party network site 154 and functionality to create a new account with the third-party network site 154.

In this example, a username field 206 and a password field 209 have been pre-populated for the user to log in to the third-party network site 154 with an existing account managed by the authentication management service 118 (FIG. 1A). Further, a region 212 is rendered by the authentication client 172 which indicates that the user is already logged in with the authentication management service 118 as "SMITH, JOHN" and that the username field 206 and the password field 209 have been pre-populated based upon a managed username 133 (FIG. 1A) and a managed security credential 136 (FIG. 1A). In various embodiments, the region 212 may correspond to an iframe, a pop-up window, a pop-over window, or other native user interface components in the network page 203. In some embodiments, the region 212 may be generated and included within the network page 203a by the proxy server application 121 (FIG. 1A). In some cases, the proxy server application 121 and/or the authentication client 172 may be configured to modify the network page 203a, for example, by removing inappropriate content, removing content relating to payment instruments or account management/creation, or performing another modification.

In another example, the user may be associated with multiple existing accounts with the third-party network site 154, and the user interface 175a may include components that facilitate a selection from among the multiple existing accounts. In another example, the authentication may be performed behind the scenes by the authentication management service 118 and/or the authentication client 172. Such an authentication may be performed using an authentication endpoint 160 (FIG. 1A) associated with the third-party network site 154 or by filling a form that is not rendered upon the display 166 (FIG. 1A).

Figure 2B:
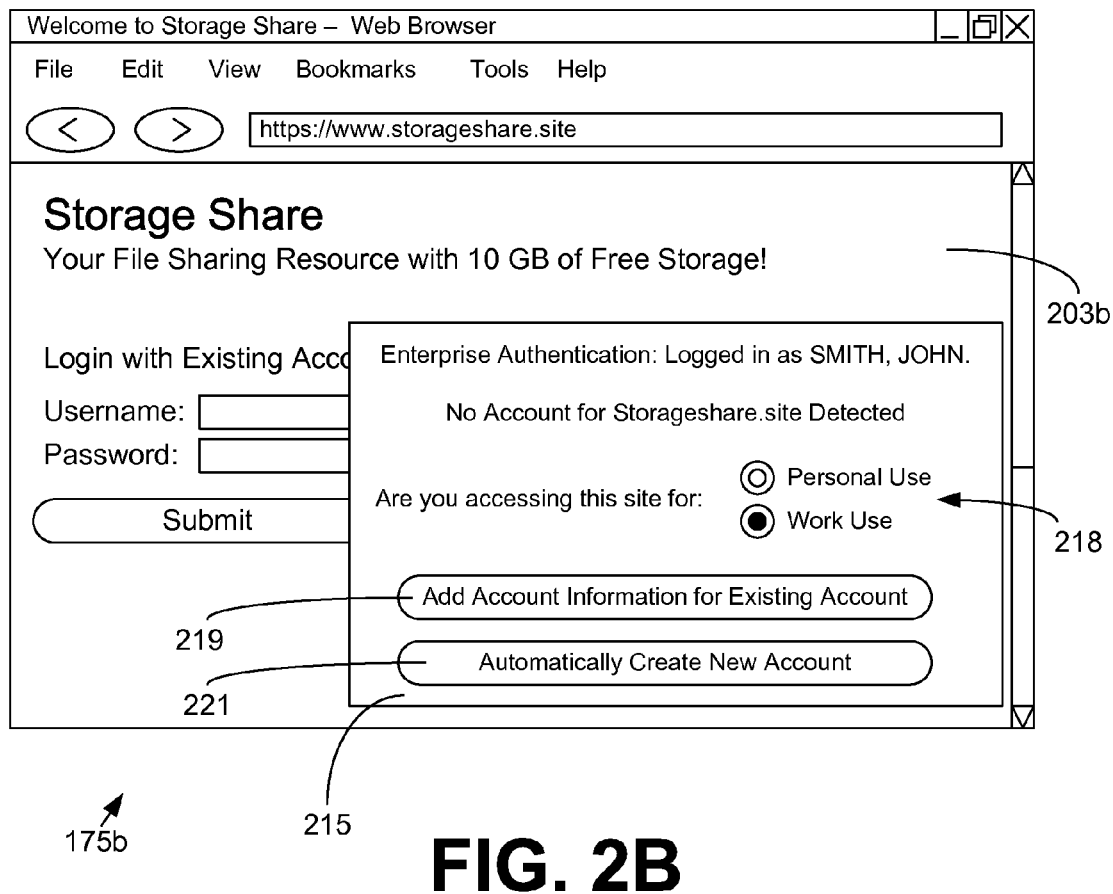

Turning now to FIG. 2B, shown is another example of a user interface 175b rendered by a client 109 (FIG. 1A) in the networked environment 100a (FIG. 1A) according to various embodiments. The user interface 175b is rendered by a browser 169 (FIG. 1A) and an authentication client 172 (FIG. 1A) executed in the client 109. The user interface 175b presents a network page 203b for a third-party network site 154 (FIG. 1A), which in this non-limiting example, is "www.storageshare.site." In contrast to the user interface 175a (FIG. 1A), the user interface 175b reflects a situation where no existing account for the third-party network site 154 is managed by the authentication management service 118 (FIG. 1A) on behalf of the authenticated user.

A region 215 is rendered by the authentication client 172 which indicates that no existing account is located for the particular third-party network site 154. In various embodiments, the region 215 may correspond to an iframe, a pop-up window, a pop-over window, or other native user interface components in the network page 203. In some embodiments, the region 212 may be generated and included within the network page 203b by the proxy server application 121 (FIG. 1A).

The region 215 may include a selection component 218 that facilitates selection between personal use or organization-related use for the third-party network site 154. Organizations may have varying policies on personal use as compared to organization-related use. For example, in one organization, an account for personal use may be disallowed. In another organization, an account for personal use may be unmanaged by the authentication management service 118. In still another organization, an account for personal use may be managed by the authentication management service 118 but with the security credentials 136 (FIG. 1A) being released to the user so that the user can still access the account after leaving the organization.

A component 219 may be provided for adding account information for an existing account with the third-party network site 154. For example, the user may already have an account with the third-party network site 154, but the account is not managed by the authentication management service 118. An interface may be rendered for the user to specify a username, password, and/or other information for the existing account. Upon submission, the account information may be stored in the third-party account data 127 (FIG. 1A) for management by the authentication management service 118. Subsequently, the authentication management service 118 may perform credential rotation, automated authentication, and/or other management functions.

A component 221 may be provided for initiating creation of a new account with the third-party network site 154. The user may be prompted to enter various information. Some or all of the account creation process may be automated by the authentication management service 118 and/or the authentication client 172 using account creation rules from the third-party account rules 130 (FIG. 1A). The account may be created by way of form filling or through an account creation endpoint 157 (FIG. 1A). Usernames 133 (FIG. 1A), security credentials 136, and/or other account information may be generated automatically by the authentication management service 118 and/or the authentication client 172. In one embodiment, a username 133 may be generated automatically based at least in part on information associated with the user in the organizational user data 124 (FIG. 1A). For example, a username of the user with the organization may be employed for generating the username 133 for the third-party network site 154.

Figure 3A:
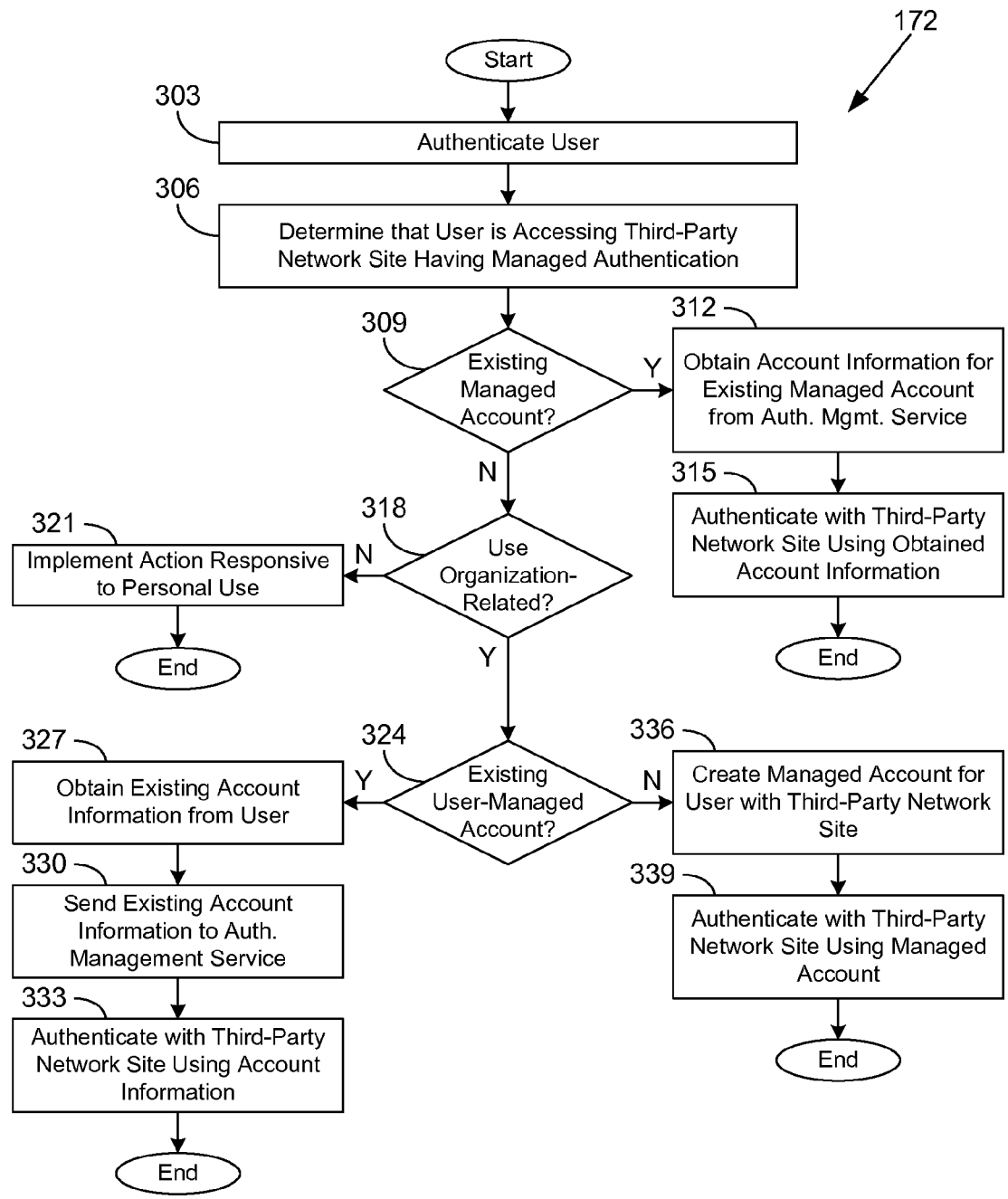
FIG. 3A is a flowchart illustrating one example of functionality implemented as portions of an authentication client executed in a client in the networked environment of FIG. 1A according to various embodiments of the present disclosure.

Referring next to FIG. 3A, shown is a flowchart that provides one example of the operation of a portion of the authentication client 172 according to various embodiments. It is understood that the flowchart of FIG. 3A provides merely an example of the many different types of functional arrangements that may be employed to implement the operation of the portion of the authentication client 172 as described herein. As an alternative, the flowchart of FIG. 3A may be viewed as depicting an example of steps of a method implemented in the client 109 (FIG. 1A) according to one or more embodiments.

Beginning with box 303, the authentication client 172 authenticates a user with identity systems of the organization. For example, the user may enter a username and password or be identified through a biometric approach. As a result, the client 109 is determined to be authorized to access third-party accounts associated with the account of the user in the organization. In one embodiment, the authentication may employ Kerberos, with a Kerberos ticket being made available to the authentication client 172 to enable authenticated communication with the authentication management service 118.

In box 306, the authentication client 172 determines that a user is accessing a third-party network site 154 (FIG. 1A) having managed authentication. For example, the third-party network site 154 may have a domain name that matches a domain name specified for managed authentication in the third-party account rules 130 (FIG. 1A). In box 309, the authentication client 172 determines whether the user has an existing managed account for the third-party network site 154. For example, the authentication client 172 may query the authentication management service 118. If the user does have an existing managed account, the authentication client 172 obtains the account information (e.g., username 133, security credentials 136, etc.) from the authentication management service 118 in box 312. In box 315, the authentication client 172 authenticates with the third-party network site 154 using the obtained account information. Thereafter, the portion of the authentication client 172 ends.

If, instead, the user does not have an existing managed account, the authentication client 172 proceeds from box 309 to box 318. In box 318, the authentication client 172 determines whether the use of the third-party network site 154 is organization-related. For example, the user may be prompted to indicate whether the use is personal or work-related. If the use is not organization-related, the authentication client 172 moves to box 321 and implements an action responsive to personal use. For example, the authentication client 172 may allow the user to manually enter a username and password to authenticate with the third-party network site 154. Alternatively, the authentication client 172 may block access to the third-party network site 154. Thereafter, the portion of the authentication client 172 ends.

If the authentication client 172 instead determines in box 318 that the use is organization-related, the authentication client 172 continues to box 324. In box 324, the authentication client 172 determines whether the user has an existing user-managed account. If the user has an existing user-managed account, the authentication client 172 transitions to box 327 and obtains the existing account information from the user. In box 330, the authentication client 172 sends the existing account information to the authentication management service 118. The existing account is subsequently managed by the authentication management service 118. In box 333, the authentication client 172 authenticates with the third-party network site 154 using the account information. Thereafter, the portion of the authentication client 172 ends.

If the authentication client 172 instead determines in box 324 that there is no existing user-managed account, the authentication client 172 continues to box 336. In box 336, the authentication client 172 creates a managed account for the user with the third-party network site 154. Alternatively, the authentication client 172 may request that the authentication management service 118 perform the account creation. In box 339, the authentication client 172 authenticates with the third-party network site 154 using the managed account. Thereafter, the portion of the authentication client 172 ends.

Figure 3B:
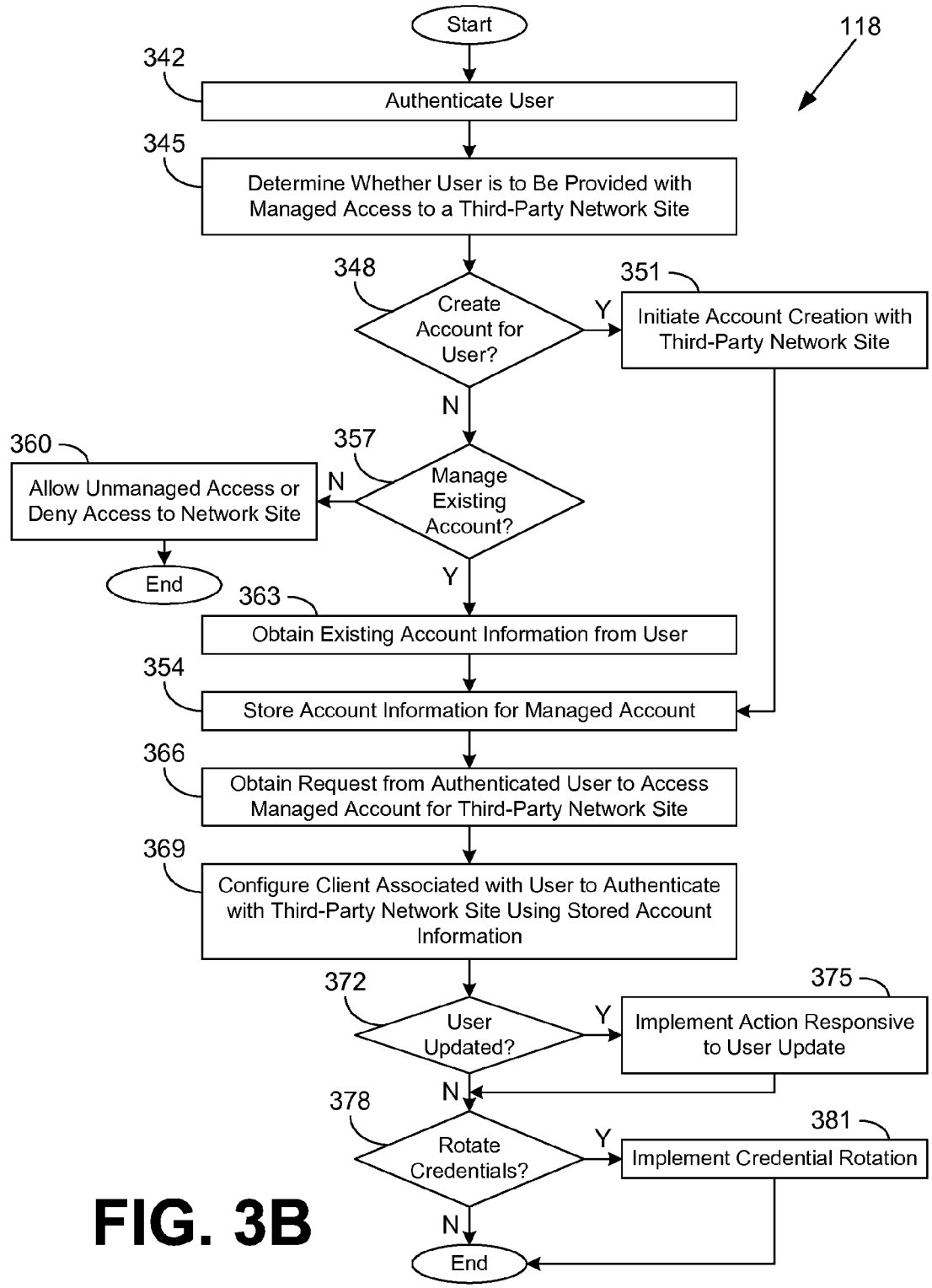
FIG. 3B is a flowchart illustrating one example of functionality implemented as portions of an authentication management service executed in a computing environment in the networked environment of FIG. 1A according to various embodiments of the present disclosure.

Continuing to FIG. 3B, shown is a flowchart that provides one example of the operation of a portion of the authentication management service 118 according to various embodiments. It is understood that the flowchart of FIG. 3B provides merely an example of the many different types of functional arrangements that may be employed to implement the operation of the portion of the authentication management service 118 as described herein. As an alternative, the flowchart of FIG. 3B may be viewed as depicting an example of steps of a method implemented in the authentication management computing environment 103 (FIG. 1A) according to one or more embodiments.

Beginning with box 342, the authentication management service 118 authenticates a user in an organization at a client 109 (FIG. 1A). In one example, the user may be a new user who has recently become associated with the organization. In box 345, the authentication management service 118 determines whether a user is to be provided with managed access to a third-party network site 154 (FIG. 1A). For example, such a determination may be based upon the role of the user in the organization and/or other data in the organizational user data 124 (FIG. 1A). In box 348, the authentication management service 118 determines whether an account is to be created for the user. In one example, the account may be created if the organization is willing to pay the third-party network site 154 for access by the user. If an account is to be created, the authentication management service 118 initiates account creation with the third-party network site 154 in box 351. The authentication management service 118 then continues to box 354.

If the authentication management service 118 instead determines that an account is not to be created, the authentication management service 118 continues from box 348 to box 357. In box 357, the authentication management service 118 determines whether an existing account is to be managed. If an existing account is not to be managed, the authentication management service 118 moves to box 360 and allows the user to access the third-party network site 154 in an unmanaged manner, or denies the user access to the third-party network site 154. Thereafter, the portion of the authentication management service 118 ends. If an existing account is to be managed, the authentication management service 118 moves from box 357 to box 363 and obtains existing account information from the user.

In box 354, the authentication management service 118 stores the account information (e.g., username 133 (FIG. 1A), security credentials 136 (FIG. 1A), etc.) for the managed account, which has either been obtained by the user or generated automatically during account creation. In box 366, the authentication management service 118 obtains a request from the authenticated user to access the managed account for the third-party network site 154. In box 369, the authentication management service 118 configures the client 109 associated with the user to authenticate with the third-party network site 154 using the stored account information. In various embodiments, the security credentials 136 may be made inaccessible to the user via the client 109. In other embodiments, the user may be able to check out the security credentials 136 or temporary security credentials 136, e.g., for manual use with a different client 109 during a specific time period. In either case, access by the user to the security credentials 136 may be restricted. In one embodiment, the security credential 136 may correspond to a cookie 139 (FIG. 1A), and the client 109 may be configured to present the cookie 139 to the third-party network site 154.

In box 372, the authentication management service 118 determines whether data associated with the user in the organizational user data 124 has been updated. For example, the user may be moved to a different role, given authorization to have an additional third-party account, withdrawn authorization to have an existing third-party account, the user may have left the organization, and so on. If the data has been updated, the authentication management service 118 moves to box 375 and implements an action responsive to the user update. For example, an account may be disabled, transferred to another user, and so on. The authentication management service 118 continues to box 378.

If the data associated with the user has not been updated, the authentication management service 118 transitions from box 372 to box 378. In box 378, the authentication management service 118 determines whether the security credentials 136 for the managed account are to be rotated. If so, the authentication management service 118 implements a credential rotation in box 381. In so doing, the authentication management service 118 may generate a replacement security credential 136 for the managed account, establish the replacement security credential 136 with the third-party network site 154, and then update the stored security credential 136 in the data store 115 (FIG. 1A) with the replacement security credential 136. Thereafter, the portion of the authentication management service 118 ends.

Figure 4A:
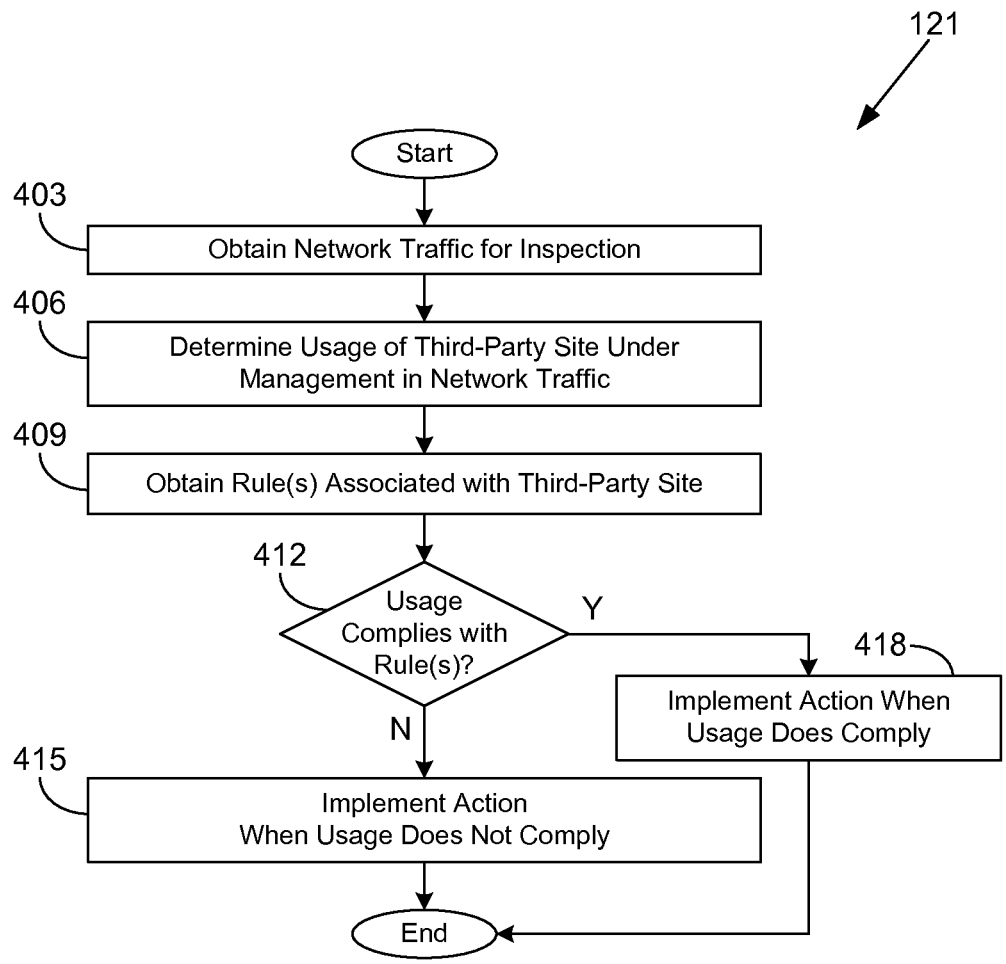
FIG. 4A is a flowchart illustrating one example of functionality implemented as portions of a proxy server application executed in a computing environment in the networked environment of FIG. 1B according to various embodiments of the present disclosure.

Turning to FIG. 4A, shown is a flowchart that provides one example of the operation of a portion of the proxy server application 121 according to various embodiments. It is understood that the flowchart of FIG. 4A provides merely an example of the many different types of functional arrangements that may be employed to implement the operation of the portion of the proxy server application 121 as described herein. As an alternative, the flowchart of FIG. 4A may be viewed as depicting an example of steps of a method implemented in the authentication management computing environment 103 (FIG. 1B) according to one or more embodiments. It is noted that in some embodiments, some or all of the network traffic inspection functionality of the proxy server application 121 as described below may be implemented in the client 109 (FIG. 1B). In one embodiment, the client 109 may be configured to cache network traffic inspection information and then later verify compliance with traffic inspection rules via communication with a service in the authentication management computing environment 103.

Beginning with box 403, the proxy server application 121 obtains network traffic between the client 109 (FIG. 1B) and the service provider computing environment 106 (FIG. 1B) for inspection. In box 406, the proxy server application 121 determines whether the network traffic corresponds to traffic between the client 109 and a third-party network site 154 (FIG. 1B) under management. For example, the network traffic may represent traffic related to a third-party account managed by the authentication management service 118 (FIG. 1B). Alternatively, the network traffic may represent traffic not related to a third-party account or related to a third-party account that is not currently managed but is required by the organization to be managed. In box 409, the proxy server application 121 obtains traffic inspection rules associated with the third-party network site 154 under management, the third-party account, and/or a corresponding user from the third-party account rules 130 (FIG. 1B).

In box 412, the proxy server application 121 determines whether the usage represented in network traffic complies with the rules. If the usage does not comply with the rules, the proxy server application 121 moves to box 415 and implements an action (e.g., disabling the third-party account, disabling the organizational account of the user, logging content of the network traffic for further review, terminating employment of the user, etc.). Thereafter, the portion of the proxy server application 121 ends. Otherwise, if the usage does comply, in box 418, the proxy server application 121 may optionally implement an action when the network traffic does comply with the rules. Such an action may involve modifying the content of the network traffic, inserting certain data values within the content, and so on. Thereafter, the portion of the proxy server application 121 ends.

Figure 4B:
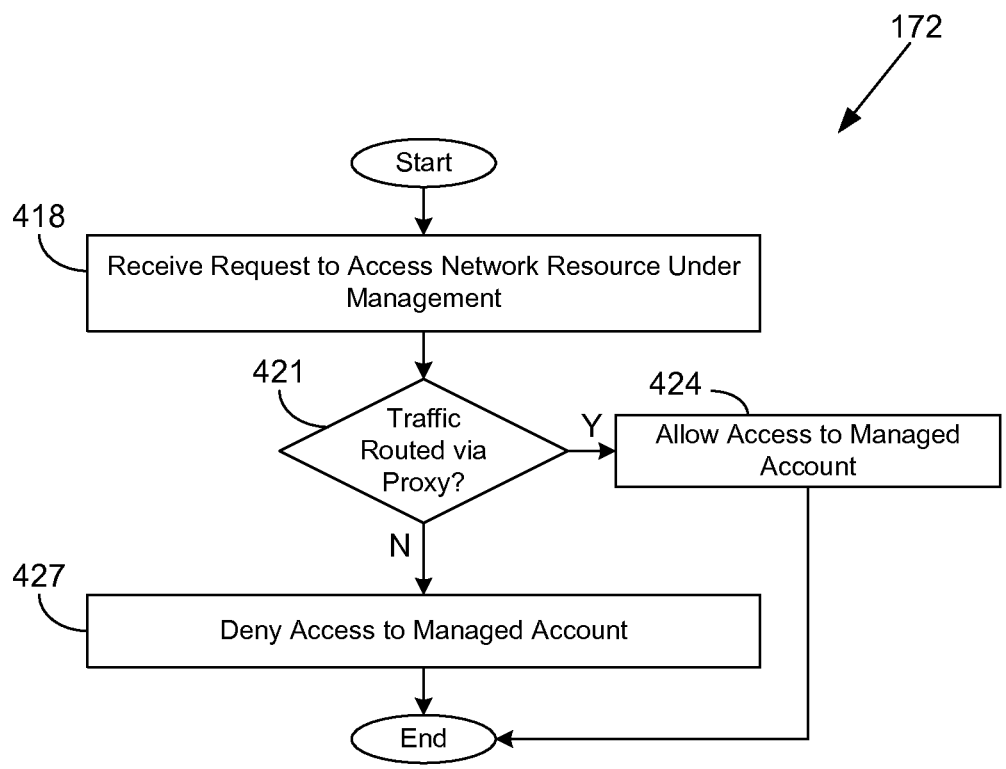
FIG. 4B is a flowchart illustrating one example of functionality implemented as portions of an authentication client executed in a client in the networked environment of FIG. 1B according to various embodiments of the present disclosure.

Moving next to FIG. 4B, shown is a flowchart that provides one example of the operation of a portion of the authentication client 172 according to various embodiments. It is understood that the flowchart of FIG. 4B provides merely an example of the many different types of functional arrangements that may be employed to implement the operation of the portion of the authentication client 172 as described herein. As an alternative, the flowchart of FIG. 4B may be viewed as depicting an example of steps of a method implemented in the client 109 (FIG. 1A) according to one or more embodiments. In the scenario of FIG. 4B, the security credentials 136 (FIG. 1A) may be exposed to the client 109, and the authentication client 172 may determine whether to allow access to the third-party account using the exposed security credentials 136. In other scenarios, the security credentials 136 may be shielded from the client 109 and authentication may be handled by the proxy server application 121 (FIG. 1A).

Beginning with box 418, the authentication client 172 receives a request to access a network resource (e.g., a network page or other file) under management by the organization (e.g., where use of a managed account is enforced). In box 421, the authentication client 172 determines whether the resulting network traffic would be or is routed by the proxy server application 121 when the client 109 is coupled to an external network 112 (FIG. 1A). In some cases, the authentication client 172 may receive a directive from the authentication management computing environment 103 (FIG. 1A)

indicating whether the network traffic is capable of being inspected, and this may substitute for a determination of whether a proxy server application 121 is being employed.

If the traffic is routed by the proxy server application 121, the authentication client 172 moves to box 424 and permits access to the managed account for the third-party network site 154 (FIG. 1A). Thereafter, the portion of the authentication client 172 ends. Otherwise, if the traffic is not routed via the proxy server application 121, the authentication client 172 moves to box 427 and denies access by the client 109 to the managed account. Thereafter, the portion of the authentication client 172 ends.

Figure 5:
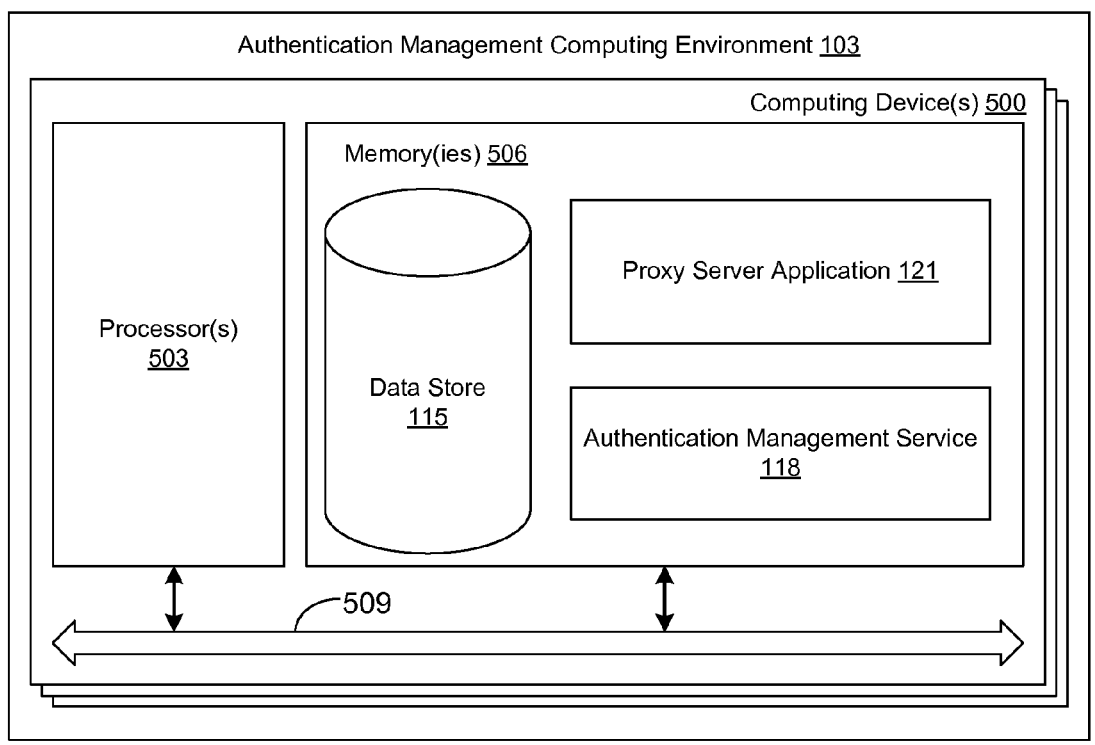
FIG. 5 is a schematic block diagram that provides one example illustration of a computing environment employed in the networked environment of FIG. 1A according to various embodiments of the present disclosure.

With reference to FIG. 5, shown is a schematic block diagram of the authentication management computing environment 103 according to an embodiment of the present disclosure. The authentication management computing environment 103 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 may be the authentication management service 118, the proxy server application 121, and potentially other applications. Also stored in the memory 506 may be a data store 115 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the authentication management service 118, the proxy server application 121, the authentication client 172 (FIG. 1A), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3A-4B show the functionality and operation of an implementation of portions of the authentication client 172, the proxy server application 121, and the authentication management service 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3A-4B show a specific order of execution, it is understood that the order of execution may differ from that which is depicted. For example, the order of execution of two or more blocks may be scrambled relative to the order shown. Also, two or more blocks shown in succession in FIGS. 3A-4B may be executed concurrently or with partial concurrence. Further, in some embodiments, one or more of the blocks shown in FIGS. 3A-4B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the authentication management service 118, the proxy server application 121, and the authentication client 172, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, comprising:
   code that manages a plurality of third-party network site accounts for a plurality of users in an organization;
   code that determines that one of the plurality of users has requested access to a third-party network site;
   code that determines whether one of the plurality of third-party network site accounts is available for use by the one of the plurality of users for accessing the third-party network site;
   code that configures a client associated with the one of the plurality of users to access the third-party network site using the one of the plurality of third-party network site accounts in response to determining that the one of the plurality of third-party network site accounts is available for use by the one of the plurality of users for accessing the third-party network site;
   code that determines whether the one of the plurality of users has an existing user-maintained account with the third-party network site;
   code initiates creation of a new third-party account with the third-party network site in response to determining that none of the plurality of third-party network site accounts is available for use by the one of the plurality of users for accessing the third-party network site and in response to determining that the one of the plurality of users does not have the existing user-maintained account with the third-party network site; and
   code that generates a user interface configured to receive a security credential for the existing user-maintained account from the one of the plurality of users in response to determining that determining that none of the plurality of third-party network site accounts is available for use by the one of the plurality of users for accessing the third-party network site and in response to determining that the one of the plurality of users has the existing user-maintained account with the third-party network site.

2. The non-transitory computer-readable medium of claim 1, wherein security credentials associated with the plurality of third-party network site accounts are inaccessible by the plurality of users.

3. The non-transitory computer-readable medium of claim 1, further comprising code that periodically rotates at least one security credential for the plurality of third-party network site accounts.

4. The non-transitory computer-readable medium of claim 1, further comprising:
   code that determines that the one of the plurality of users has left the organization; and
   code that disables at least one of the plurality of third-party network site accounts associated with the one of the plurality of users in response to determining that the one of the plurality of users has left the organization.

5. A system, comprising:
   at least one computing device; and
   at least one application executable in the at least one computing device, the at least one application comprising:
   logic that determines whether a user in an organization is to be provided with managed access to a third-party network site;
   logic that manages a first account for the user with the third-party network site in response to determining that the user is to be provided with managed access to the third-party network site;
   logic that stores a security credential for the managed first account;
   logic that configures a client computing device associated with the user to authenticate with the third-party network site using the security credential, wherein access by the user to the security credential is restricted; and
   logic that disables access by the user to the third-party network site via a second account that is not managed by the logic that manages the first account, wherein, in response to the access via the second account being disabled, the user is required to use the first account instead of the second account to access the third-party network site.

6. The system of claim 5, wherein the at least one application further comprises logic that verifies that the security credential for the managed first account has not been changed by the user.

7. The system of claim 5, wherein the at least one application further comprises:
   logic that receives auditing data for the managed first account from the third-party network site; and
   logic that determines whether use of the managed first account recorded in the auditing data complies with a rule for acceptable use of the managed first account.

8. The system of claim 5, wherein the at least one application further comprises:
   logic that generates a replacement security credential for the managed first account;
   logic that establishes the replacement security credential for the managed first account with the third-party network site; and
   logic that updates the stored security credential with the replacement security credential.

9. The system of claim 5, wherein the at least one application further comprises:
   logic that determines that the user is no longer to be provided with access to the managed first account; and
   logic that disables access to the managed first account by the user in response to determining that the user is no longer to be provided with access to the managed first account.

10. The system of claim 9, wherein the at least one application further comprises logic that enables access to the managed first account for another user in the organization after disabling access to the managed first account by the user.

11. The system of claim 5, wherein the at least one application further comprises:
    logic that determines whether the organization will pay the third-party network site for access by the user; and
    wherein the logic that manages the first account for the user is configured to create the managed first account for the user in response to determining that the organization will pay the third-party network site for access by the user.

12. The system of claim 5, wherein the at least one application further comprises logic that configures the managed first account to employ a managed channel of communication for security credential reset requests through the third-party network site, the managed channel of communication being inaccessible by the user.

13. The system of claim 5, wherein the logic that manages the account for the user is configured to create the managed first account for the user in response to the user accessing the third-party network site via the client.

14. The system of claim 5, wherein the logic that stores the security credential is configured to associate the security credential with a user identity of the user for the organization.

15. A method, comprising:
    authenticating, via at least one of one or more first computing devices, an identity of a user in an organization;
    receiving, via at least one of the one or more first computing devices, security credentials for one of a plurality of third-party accounts from a second computing device in response to authenticating the identity of the user, wherein the security credentials for the plurality of third-party accounts are managed by the organization on behalf of the user;
    determining, via at least one of the one or more first computing devices, that the user has requested access to a third-party network site associated with the one of the plurality of third-party accounts;
    authenticating, via at least one of the one or more first computing devices, with the third-party network site using the security credential for the one of the plurality of third-party accounts;
    causing, via at least one of the one or more first computing devices, a user interface to be rendered based at least in part on data received from the third-party network site after authentication with the third-party network site; and
    disabling, via at least one of the one or more computing devices, access by the user to the third-party network site via an account that is not managed by the organization, wherein, in response to the access via the account that is not managed by the organization being disabled, the user is required to use the one of the plurality of third-party accounts instead of the account that is not managed by the organization to access the third-party network site.

16. The method of claim 15, wherein the security credentials are inaccessible to the user via the first computing device.

17. The method of claim 15, further comprising:
    determining, via at least one of the one or more first computing devices, that the user has requested access to another third-party network site;
    determining, via at least one of the one or more first computing devices, that the other third-party network site is unassociated with the plurality of third-party accounts; and
    initiating creation, via at least one of the one or more first computing devices, of an account with the other third-party network site for the user in response to determining that the other third-party network site is unassociated with the plurality of third-party accounts.

18. The method of claim 17, further comprising:
    rendering, via at least one of the one or more first computing devices, a user interface that displays a message that prompts the user to confirm that usage of the other third-party network site is related to the organization;
    receiving, via at least one of the one or more first computing devices, a user confirmation via the user interface that usage of the other third-party network site is related to the organization; and
    initiating, via at least one of the one or more first computing devices, a creation of the account with the other third-party network site in response to receiving the user confirmation that the usage of the other third-party network site is related to the organization.

19. The method of claim 15, further comprising:
    determining, via at least one of the one or more first computing devices, that the user has requested access to another third-party network site;
    receiving, via at least one of the one or more first computing devices, a security credential for a user-managed third-party account with the other third-party network site from the user;
    sending, via at least one of the one or more first computing devices, the security credential for the user-managed third-party account to the second computing device; and
    importing, via at least one of the one or more first computing devices, the user-managed third-party account to become managed by the organization on behalf of the user, wherein the organization subsequently controls access to the security credential of the user-managed third-party account that has become managed.

20. The non-transitory computer-readable medium of claim 1, further comprising code that changes the security credential for the existing user-maintained account to a different security credential.

* * * * *